(12) United States Patent
Shaheen (10) Patent No.: US 11,141,796 B2
(45) Date of Patent: Oct. 12, 2021

(54) DOUBLE-SIDED CUTTING INSERT HAVING ORIENTATION-ASSISTING CLAMPING RECESSES AND CUTTING TOOL

(71) Applicant: Iscar, Ltd., Tefen (IL)

(72) Inventor: Philip Shaheen, Tarshiha (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/200,796

(22) Filed: Nov. 27, 2018

(65) Prior Publication Data

US 2019/0160556 A1 May 30, 2019

Related U.S. Application Data

(60) Provisional application No. 62/591,843, filed on Nov. 29, 2017.

(51) Int. Cl.
*B23B 27/16* (2006.01)

(52) U.S. Cl.
CPC ...... *B23B 27/1611* (2013.01); *B23B 27/1622* (2013.01); *B23B 2200/3618* (2013.01); *B23B 2200/3681* (2013.01)

(58) Field of Classification Search
CPC ............ B23B 27/1603; B23B 27/1611; B23B 27/1622; B23B 27/1659; B23B 27/1662; B23B 27/1651; B23B 27/1677; B23B 27/1607; B23B 2205/045; B23B 2205/04; B23B 2205/00; B23B 2260/096; B23B 27/16; B23B 27/163; B23B 27/1614; B23B 27/1618; B23B 27/145; B23B 2200/125; B23B 2200/126; B23B 2200/12; B23C 2200/3618; B23C 2200/1681;
(Continued)

(56) References Cited

U.S. PATENT DOCUMENTS 3,299,489 A * 1/1967 Pohle .................. B23B 27/1614
407/104
3,314,126 A 4/1967 Stier
(Continued)

FOREIGN PATENT DOCUMENTS

DE 1246360 B 8/1967
DE 2102479 A1 * 8/1972 ......... B23B 27/1614
(Continued)

OTHER PUBLICATIONS

Description FR1245148 (translation) obtained at https://worldwide.espacenet.com/ (last visited Apr. 28, 2020).*
(Continued)

*Primary Examiner* — Ryan Rufo
(74) *Attorney, Agent, or Firm* — Womble Bond Dickinson (US) LLP (57) ABSTRACT

A double-sided cutting insert with orientation-assisting geometry includes identical and opposite first and second main surfaces and a peripheral surface which extends therebetween. The insert further includes a median plane located midway between the first and second main surfaces and opposite first and second clamping recesses opening out respectively to the first and second main surfaces. Projections onto the median plane of at least portions of the first and second clamping recesses are rotationally offset from one another about a central axis.

22 Claims, 5 Drawing Sheets

(58) Field of Classification Search
CPC .............. B23C 5/2221; B23C 5/2213; B23C 2200/361; B23C 5/202; B23C 5/207; B23C 5/2217; B23C 5/2204; B23C 5/2208
See application file for complete search history.

(56) References Cited

U.S. PATENT DOCUMENTS

| | | | |
|---|---|---|---|
| 3,777,341 A * | 12/1973 | Faber | B23B 27/1614 407/114 |
| 3,902,232 A | 9/1975 | Hertel | |
| 4,087,192 A * | 5/1978 | Hertel | B23B 27/1618 407/114 |
| 4,283,163 A | 8/1981 | Gräfe et al. | |
| 6,773,210 B2 | 8/2004 | Erickson | |
| 7,347,650 B2 * | 3/2008 | Tipu | B23B 27/1662 407/101 |
| 7,431,539 B2 | 10/2008 | Erickson et al. | |
| 8,573,899 B2 | 11/2013 | Park et al. | |
| 8,708,617 B2 | 4/2014 | Choi et al. | |
| 9,821,382 B2 * | 11/2017 | Daub | B23C 5/207 |
| 9,901,986 B2 | 2/2018 | Makhlin et al. | |
| 2004/0223816 A1 * | 11/2004 | Sheffler | B23C 5/2221 407/34 |
| 2004/0223819 A1 * | 11/2004 | Sheffler | B23C 5/2221 407/108 |
| 2008/0193233 A1 | 8/2008 | Park | |
| 2010/0129167 A1 * | 5/2010 | Morrison | B23B 27/141 407/114 |
| 2012/0082522 A1 | 4/2012 | Hecht et al. | |
| 2013/0121776 A1 * | 5/2013 | Majima | B23B 27/1614 407/104 |
| 2013/0177360 A1 * | 7/2013 | Hecht | B23C 5/207 407/113 |
| 2016/0288215 A1 | 10/2016 | Harif | |
| 2016/0288216 A1 | 10/2016 | Joo | |

FOREIGN PATENT DOCUMENTS

| | | | | |
|---|---|---|---|---|
| EP | 3006141 A1 * | 4/2016 | ............ | B23B 27/141 |
| FR | 1245148 A * | 11/1960 | ......... | B23B 27/1603 |
| SU | 1255287 A1 * | 9/1986 | ......... | B23B 27/1625 |
| WO | WO-03022495 A1 * | 3/2003 | ........... | B23C 5/2221 |

OTHER PUBLICATIONS

Description WO03022495 (translation) obtained at https://worldwide.espacenet.com/ (last visited Apr. 28, 2020).*
International Search Report dated Mar. 25, 2019, issued in PCT counterpart application (No. PCT/IL2018/051288).
Written Opinion dated Mar. 25, 2019, issued in PCT counterpart application (No. PCT/IL2018/051288).

* cited by examiner

DOUBLE-SIDED CUTTING INSERT HAVING ORIENTATION-ASSISTING CLAMPING RECESSES AND CUTTING TOOL

RELATED APPLICATIONS

This application claims priority to U.S. Provisional Patent Application No. 62/591,843, filed 29 Nov. 2017, the contents of which are incorporated by reference in their entirety.

FIELD OF THE INVENTION

The subject matter of the present application relates to machining, or chip removing cutting tools. Specifically, it relates to double-sided cutting inserts which include "fool-proof" insertion-correction, or orientation-assisting coupling recesses which prevent incorrect seating of an insert into a pocket and subsequent damage to the pocket.

BACKGROUND OF THE INVENTION

It is known in the field that incorrect orientation of an insert in the pocket can subsequently cause damage to the insert, the workpiece, the pocket and even the whole tool.

In some inserts, due to certain symmetries and/or small size, it can be difficult to distinguish, with the naked eye, between a region in the insert configured for cutting and a region configured only for abutment. Therefore, in many scenarios, it is problematic for an operator to determine, and secure the insert, in the correct orientation in the pocket. To prevent incorrect insertion, or securement of an insert in a pocket, some manufacturers include visual aids, such as markings (numbering, symbols). Visual aids usually work well, however, in many scenarios they are not effective. For example, poor lighting will usually cause an operator to misread markings on already-miniscule inserts.

Another type of insert which can cause similar problems, are inserts which have more than one distinct cutting portion on a single main surface.

The present invention overcomes these aforementioned disadvantages by providing an orientation-assisting geometry which can be independent from the cutting portion(s) and/or external abutment geometry.

SUMMARY OF THE INVENTION

In accordance with a first aspect of the subject matter of the present application there is provided a double-sided cutting insert with orientation-assisting geometry, the insert comprising:
  opposite and identical first and second main surfaces and a peripheral surface extending therebetween; and
  opposite, first and second clamping recesses opening out respectively to the first and second main surfaces;
wherein
  when superimposed onto the median plane, the first and second clamping recesses do not completely overlap.

In accordance with a second aspect of the subject matter of the present application there is provided a double-sided cutting insert having orientation-assisting geometry and a central axis around which the insert is indexable, the insert comprising:
  opposite and identical first and second main surfaces and an insert peripheral surface extending therebetween, each main surface comprising a cutting portion,
  a median plane perpendicular to the central axis and located midway between the first and second main surfaces; and
  opposite first and second clamping recesses opening out respectively to the first and second main surfaces;
  wherein:
  each clamping recess is elongated in a direction parallel to the median plane, along an elongation axis;
  each clamping recess comprises a recess peripheral surface, each of which comprises at least one recess abutment surface; and
  projections onto the median plane of at least portions of the first and second clamping recesses are rotationally offset with respect to one another about the central axis.

In accordance with a third aspect of the subject matter of the present application there is provided a cutting tool comprising a tool body having a pocket and the insert secured therein, the pocket comprising:
  a base abutment surface;
  first and second wall abutment surfaces; and
  a clamping member configured to abut one of the first and second clamping recesses of the insert and secure it to thereby secure the insert in the pocket.

Any of the following features, either alone or in combination, may be applicable to any of the above aspects of the subject matter of the application:

No cutting portion of the first main surface is located opposite a cutting portion of the second main surface.

The insert includes exactly two cutting portions.

The first and second clamping recesses connect to one another to thereby form a through hole connecting the first and second main surfaces.

In a projection onto the median plane of outlines of the two recess peripheral surfaces, the projected outline of one recess peripheral surface intersects the projected outline of the other recess peripheral surface only at four vertices.

In a projection onto the median plane of outlines of the two recess peripheral surfaces, the projected outline of one recess peripheral surface is rotationally offset about the central axis with respect to the projected outline of the other recess peripheral surface.

In a projection onto the median plane of outlines of the two recess peripheral surfaces, no portion of the projected outline of one recess peripheral surface is tangent to any portion of the projected outline of the other recess peripheral surface.

The elongation axes form an offset angle therebetween; and the offset angle ($\alpha$) is 90 degrees.

The recess abutment surface can extend in a direction perpendicular to the median plane.

The clamping recesses are non-threaded.

Each clamping recess is longer in a direction along its corresponding elongation axis than in any other direction.

None of the clamping recesses extends beyond the median plane.

The first and second clamping recesses are identical to one another.

Each clamping recess further comprises a screw abutment surface which opens out to a corresponding main abutment surface.

One of the first and second main surfaces abuts the base abutment surface and the insert peripheral surface abuts the first and second wall abutment surfaces.

The tool body further comprises an adjustment bore configured to receive an adjustment screw;

the clamping member is a clamping lever occupying a clamping bore which is connected to the adjustment bore: and the clamping lever abuts the recess abutment surface, to secure the insert in the pocket.

Each clamping recesses further comprises a screw abutment surface which opens out to a corresponding main abutment surface; and the clamping member is a clamping screw which abuts the screw abutment surface to secure the insert in the pocket, without contacting the recess abutment surface.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is drawn to FIGS. 1 to 4. A machining or cutting tool 10 includes at least one cutting insert 12 secured in a pocket 14 in a tool body 16. According to the present embodiment, the cutting tool 10 is a turning tool.

Figure 10:
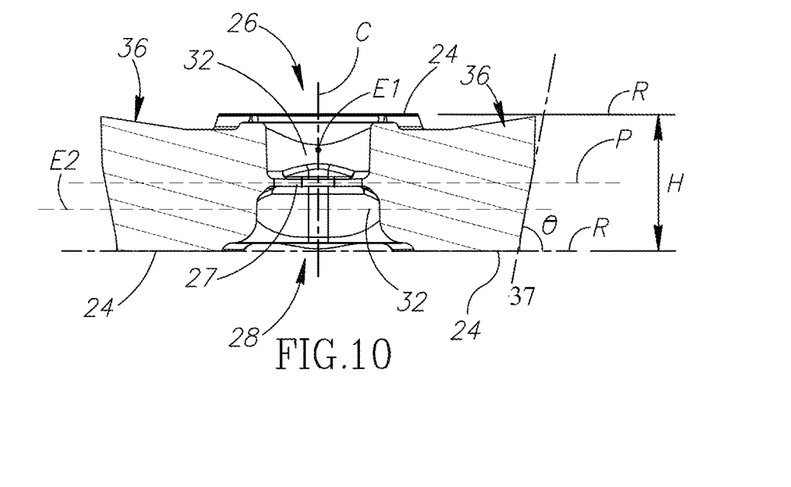
FIG. 10 is a cross-sectional view of the insert of FIG. 1 taken along line X-X of FIG. 9.
Figure 11:
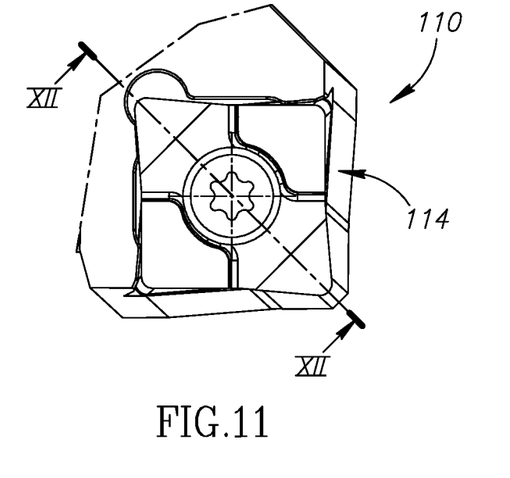
FIG. 11 is a top view of a second embodiment of an assembled turning tool.
Figure 12:
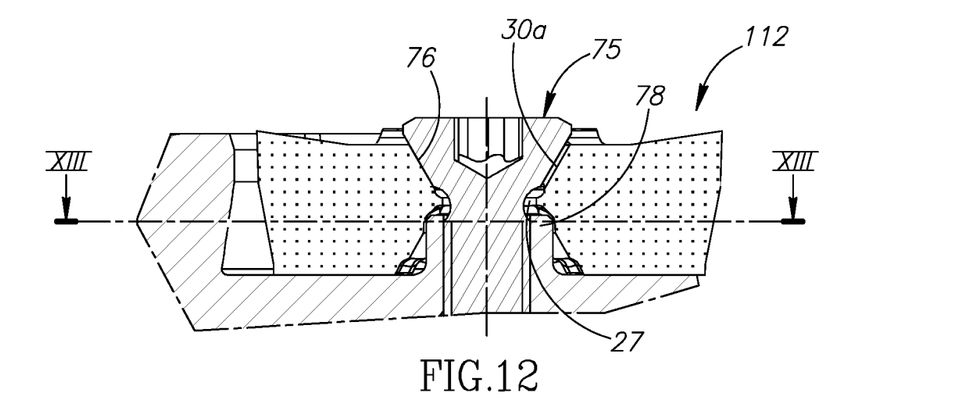
FIG. 12 is a cross-sectional view taken along line XII-XII of FIG. 11.
Figure 13:
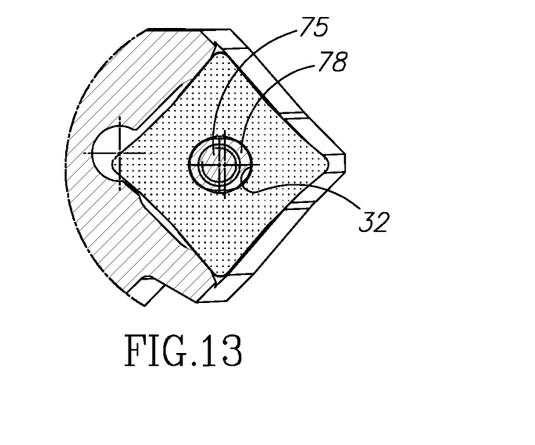
FIG. 13 is a cross-sectional view taken along line XIII-XIII of FIG. 12.

The insert 12 is double-sided and it can be indexable. The word indexable refers to inserts which have two or more independent cutting geometries on each of the two sides of the insert. The insert 12 includes opposite and identical first and second main surfaces 18, 20 and an insert peripheral surface 22 which extends therebetween. The first and second main surfaces may, for ease of convenience, be referred to as top surface 18 and bottom surface 20. Each of the first and second main surfaces 18, 20 includes a main abutment surface 24. The main abutment surfaces 24 are planar and parallel to each other. The insert 12 further includes a median plane P located precisely midway between the first and second main surfaces 18, 20 and thus also between the main abutment surfaces 24. The median plane P is parallel to the main abutment surfaces 24. A reference plane R is defined as a coplanar extension of each of the main abutment surfaces 24. A plan view of one of the main surfaces 18, 20 is directed perpendicularly to the reference plane R. The median plane P is parallel to the reference plane R. As seen in FIG. 10, a height H of the insert is established by the distance between the two reference planes R.

The insert 12 is typically made from extremely hard and wear-resistant material such as cemented carbide by form-pressing and sintering carbide powders in a binder. The cemented carbide may be, for example, tungsten carbide. The insert 12 may be coated or uncoated.

Figure 1:
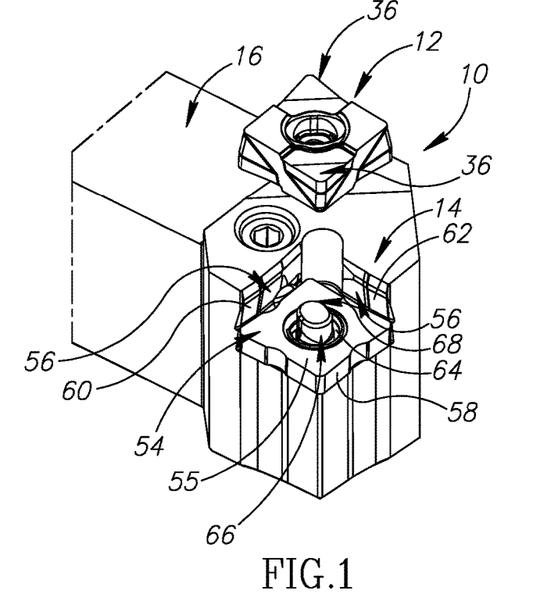
FIG. 1 is an isometric semi-exploded view of a turning tool with a turning insert.
Figure 2:
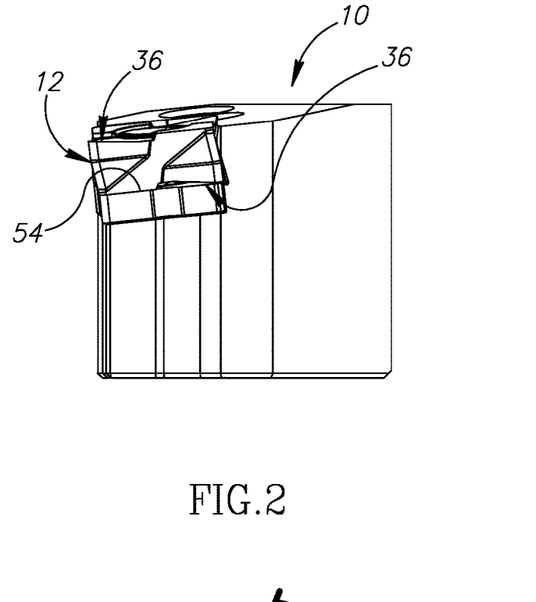
FIG. 2 is a side view of the tool of FIG. 1, with the insert secured in a pocket.
Figure 3:
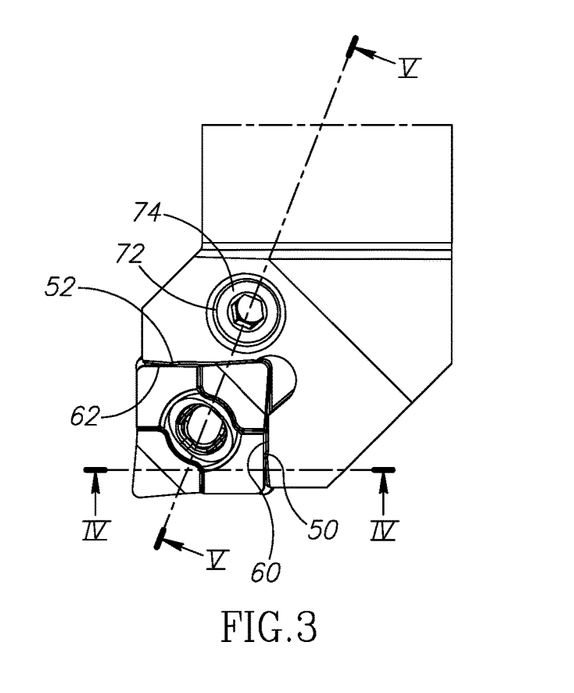
FIG. 3 is a top view of the tool of FIG. 1.
Figure 4:
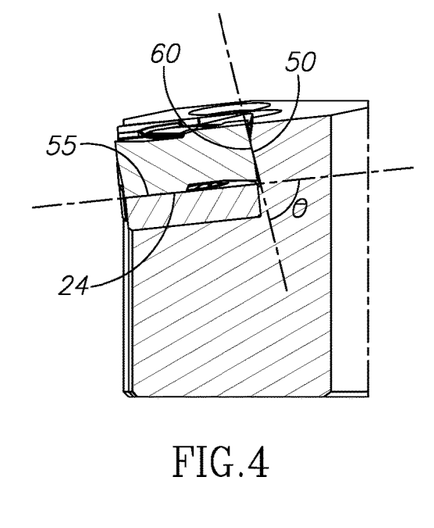
FIG. 4 is a cross-sectional view of the tool of FIG. 1 taken along line IV-IV of FIG. 3.
Figures 5, 6, 7:
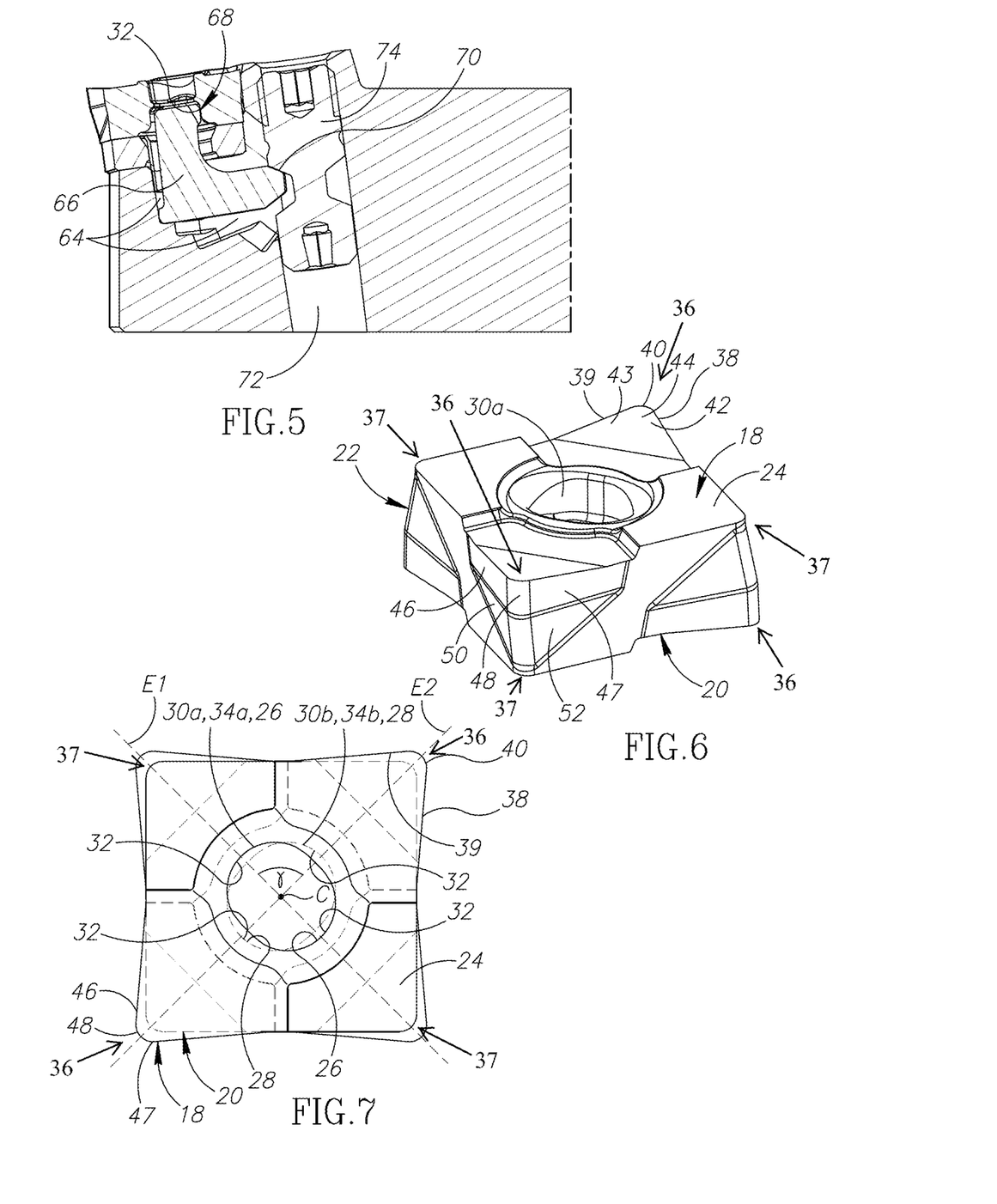
FIG. 5 is a cross-sectional view of the tool of FIG. 1 taken along line V-V of FIG. 3
FIG. 6 is an isometric view of the insert of FIG. 1.
FIG. 7 is a plan view of a first main surface of the insert of FIG. 1 with hidden lines which represent at least a portion of the features of an opposite second main surface.
Figure 14:
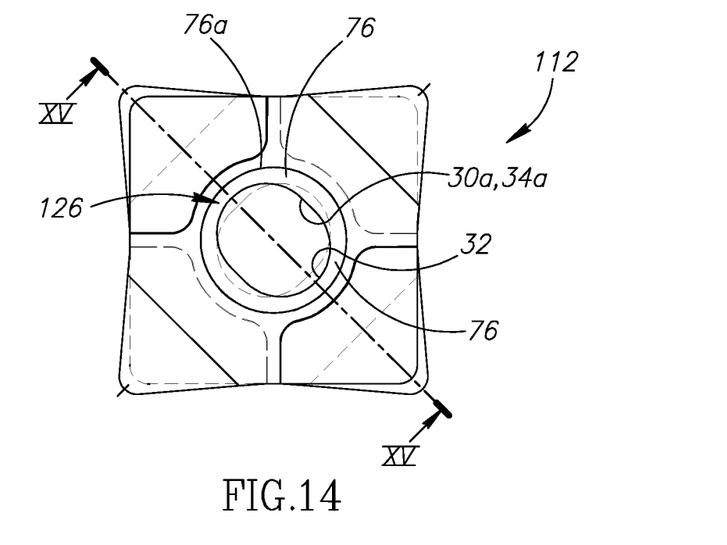
FIG. 14 is a plan view of the first main surface of the insert of FIG. 11 with hidden lines which represent at least a portion of the features of an opposite second main surface.

In a view perpendicular to the median plane P, the insert 12 has first and second clamping recesses 26, 28. The first and second clamping recesses 26, 28 can connect to one another, thereby forming a through bore 27 passing through the insert and connecting the two main surfaces 18, 20. Each of the first and second clamping recesses 26, 28 has, and extends along, a common insert central axis C which is perpendicular to the median plane P. Each clamping recess 26, 28 has a corresponding recess peripheral surface 30a, 30b, respectively. As seen in FIGS. 7 and 14, in a view along the central axis C, at least a portion of each of the first and second clamping recesses 26, 28, and specifically their corresponding peripheral surfaces 30a, 30b can be elongated. In the same figures, the solid line represents the first clamping recess 26, and the dashed line represents the second clamping recess 28 located on the opposite side of the insert 12. It is understood, however, that in the views of FIGS. 7 and 14, the first clamping recesses 26, 126 would be visible only up to the radially innermost portions thereof.

As can also be seen from the figures, the two clamping recesses 26, 28 can each have a generally elongated, or oval, shape. In a plan view of any of the first or second main surfaces 18, 20, the first and second clamping recesses 26, 28 do not completely overlap, and are rotationally offset, or twisted, with respect to each other about the central axis C. In other words, outlines, or contours, of the elongated portions of the first and second clamping recesses 26, 28 projected, or superimposed onto the median plane P, do not completely overlap and are rotationally offset. Also, outlines of the first and second clamping recesses 26, 28 projected onto the median plane P do not have curved portions which are superimposed onto one another. In other words, no curved portion of the outline of one clamping recess is tangent to a curved portion of the outline of the other clamping recess, when projected onto the median plane P.

Figure 15:
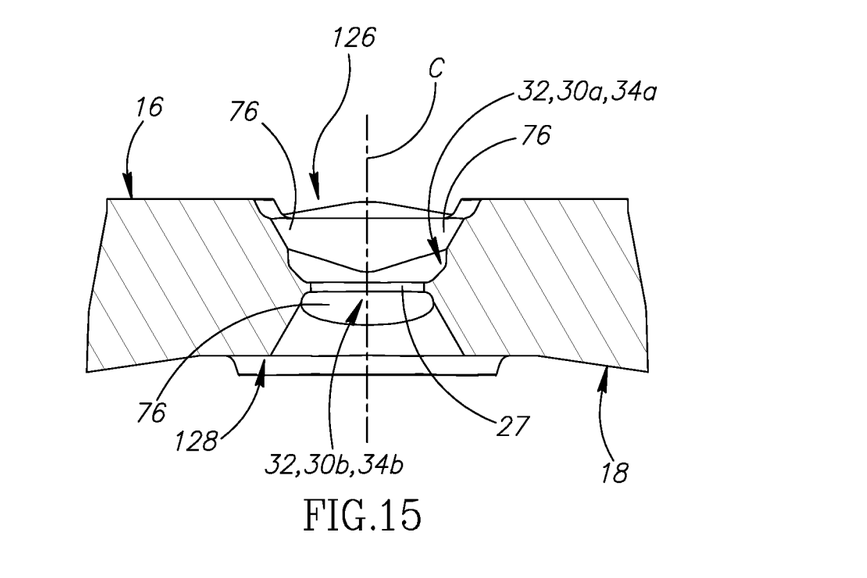
FIG. 15 is a cross-sectional view taken along line XV-XV of FIG. 14.

Each clamping recess 26, 28 opens out to a corresponding main surface 18, 20, respectively. Each clamping recess 26, 28 can open out to a respective main abutment surface 24 and can connect to each other, thereby forming a through bore 27 through the thickness of the insert (FIGS. 10 and 15). Each clamping recess 26, 28 has a non-circular shape in a view along the insert central axis C, and has a single elongation axis E1, E2, respectively. The elongation axes E1, E2 represent the direction of the longest dimension of the corresponding clamping recess (26, 28) in a plan view of one of the first and second main surfaces 18, 20, taken perpendicular to the central axis C (FIGS. 7 and 14). Each elongation axis E1, E2 is parallel to the median plane P. According to the present embodiments, each clamping recess 26, 28 can have mirror symmetry about its elongation axis E1, E2 in a view along the central axis C. The central axis C is perpendicular to, and intersects with, the elongation axes E1, E2. Each clamping recess 26, 28 has a corresponding recess peripheral surface 30a, 30b. At least a portion of each recess peripheral surface 30a, 30b can be parallel to the respective central axis C. At least of portion of the recess peripheral surface 30a, 30b can be slightly inclined (1-3 degrees) to the central axis C for production process reasons (e.g., for easy mold extraction, as is well-known in the field). At least a portion of the recess peripheral surface 30a, 30b is elongated along its elongation axis E1, E2, respectively, in a view along the central axis C.

According to some embodiments, the elongation of the clamping recesses 26, 28 is designed to accommodate locking lever heads with a corresponding shape. The lack of overlap is aimed at preventing incorrect insertion of the insert into the pocket since the lever heads will only fit the clamping recess with a specific orientation.

Attention is drawn to FIGS. 7, 10, 14 and 15. Each recess peripheral surface 30a, 30b includes a recess abutment surface, shown generally as 32, configured to receive and abut a coupling member 66, 75. According to the present embodiments, each recess peripheral surface 30a, 30b includes exactly two opposite recess abutment surfaces 32 which are located in close proximity to, or are intersected by, a corresponding elongation axis E1, E2. In a view along the central axis C from the first main surface 18, the recess abutment surfaces 32 associated with clamping recess 26 is visible and can be concave, while the recess abutment surfaces 32 associated with the clamping recess 28 are hidden from view. Furthermore, when projected onto the median plan P, the recess abutment surfaces 32 of the first and second clamping recesses 26, 28 do not overlap. In other words, shape outlines, or contours, of the recess abutment surfaces 32 projected onto the median plane P do not overlap.

Attention is drawn to FIG. 7. According to the present example, in a view perpendicular to the median plane P, recess outlines 34a, 34b of each of the first and second clamping recesses 26, 28 projected onto the median plane P, intersect at only four vertices.

According to the present embodiment, at least portions of each of the first and second clamping recesses 26, 28 are angularly twisted (i.e., rotationally offset from one another) about the central axis C. Specifically, in a view along central axis C, the elongation axes E1, E2 form a non-zero offset angle α therebetween. According to the present application, the offset angle α is 90 degrees within production tolerances. In other words, the first and second clamping recesses 26, 28 are rotationally offset from another by the offset angle α of 90 degrees.

The insert 12, 112 includes at least one cutting portion 36 per main surface 18, 20. According to the present embodiments, in each of the first and second main surfaces 18, 20, the insert 12, 112 includes exactly two cutting portions 36, located on diagonally opposite sides of the respective central axis C and two non-cutting portions 37 located on two other diagonally opposite sides of the central axis C. Each cutting portion 36 is configured for machining a workpiece. According to the present embodiment, e.g., in a plan view of the first main surface 18 (FIG. 7), the elongation axis E1 which belongs to the first main surface 18, intersects the cutting portions 36 of the second main surface 20. In other words, each elongation axis belonging to one main surface, can intersect the cutting portion 36 of the opposite main surface. Thus, the single elongation axis E1, E2 of each clamping recess extends along a direction between the non-cutting portions 37 of the main surface 18, 20 to which that clamping recess opens.

Each cutting portion 36 can include, e.g., first and second main cutting edges 38, 39 and a corner cutting edge 40 which extends therebetween. Each cutting portion 36 further includes first second and corner rake surfaces 42, 43, 44 which extend respectively from the cutting edges 38, 39, 40 towards the clamping recess 26, 28.

According to the present embodiments, no cutting portion 36 belonging to one main surface is located opposite to a cutting portion 36 belonging to the other main surface, in a direction parallel to the central axis C. Thus, in a view along the central axis C, no cutting portion 36 of the first main surface 18 overlaps, or intersects, a cutting portion 36 of the second main surface 20, or vice versa. In other words, when the cutting portions 36 associated with both main surfaces 18, 20 are projected onto the median plane P, none of the cutting portions 36 overlap or intersect. In the present example, in a view along either central axis C, the cutting portions 36 are symmetrically arranged on each of the first and second main surfaces 18, 20, and located on diagonally opposite sides of the respective central axis C. In other words, in a plan view thereof, each of the first and second main surfaces 18, 20 has a 180 degree rotational symmetry about the respective central axis C.

The insert peripheral surface 22 includes first, second and corner relief surfaces 46, 47, 48. According to the present example, each of the first and second main cutting edges 38, 39 is formed respectively at intersections of the first and second rake surfaces 42, 43 and first and second relief surfaces 46, 47. Similarly, each corner cutting edge 40 is formed at an intersection of the corner rake surface 44 and the corner relief surface 48. According to the present embodiment, the relief surfaces 46, 47, 48 are defined as negative. More particularly, they are perpendicular to the median plane P.

Figures 8, 9:
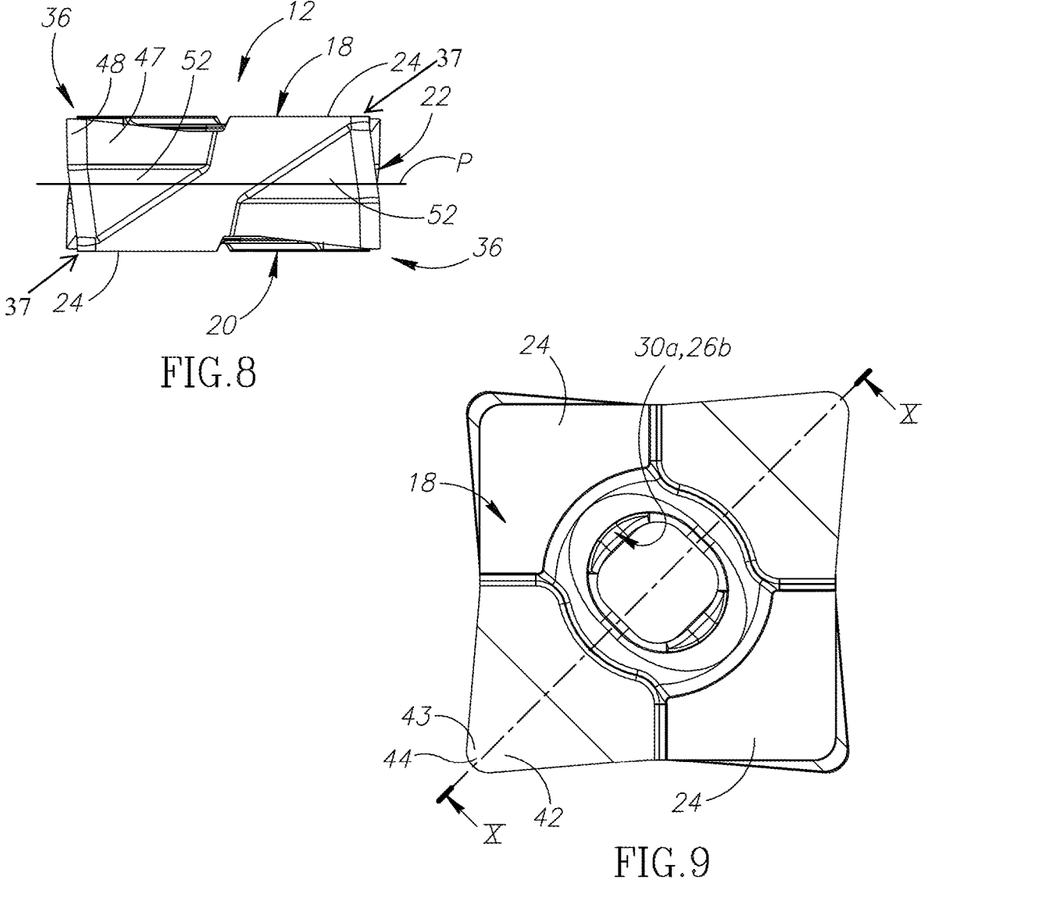
FIG. 8 is a side view of the insert of FIG. 1.
FIG. 9 is a plan view of the first main surface of the insert of FIG. 1.

Between each cutting portion 36 and the median plane P, the insert peripheral surface 22 further includes associated first and second side abutment surfaces 50, 52. Specifically, according to the present embodiment, first and second side abutment surfaces 50, 52 extend respectively from the first and second relief surfaces 46, 47. The side abutment surfaces 50, 52 extend from the relief surfaces 46, 47, inwardly, towards the central axes C. As best seen in FIG. 8, the side abutment surfaces 50, 52 which extend from relief surfaces 46, 47 of either main surface 18, 20 extend past the median plane P towards the opposite main surface.

The pocket 14 includes a base surface 54 and preferably two pocket walls 56 which extend transversely with respect to the base surface 54. The base surface 54 has a base abutment surface 55 which is preferably planar and configured to support and abut the insert 12, and specifically each of the main abutment surfaces 24. According to the present embodiment, the pocket 14 includes a shim 58 which includes the base surface 54 and the base abutment surface 55. The shim 58 is known as an optional replaceable element which helps protect the pocket geometry from wear and allows to couple inserts of different sizes in the same pocket, without the need to replace the whole tool body 16.

The pocket walls 56 include respective first and second wall abutment surfaces 60, 62 which are planar and form respective acute wall angles θ with the base abutment surface 55. Similarly, to maximize abutment quality (e.g., sufficient contact area), the same wall angle θ is preferably also formed between each side abutment surface 50, 52 and the median plane P.

According to the present embodiment, and within a preferred coupling arrangement, the pocket 14 includes a clamping bore 64 which opens out to the base surface 54 and an L-shaped clamping lever 66 which is located in the clamping bore 64. The lever 66 has first and second lever ends 68, 70, and the first lever end 68 protrudes outwardly from the clamping bore 64 into the pocket 14. The tool body 16 includes a threaded adjustment bore 72 which is located adjacent to, and communicates with, the clamping bore 64. The second lever end 70 protrudes into the adjustment bore 72. The adjustment bore 72 includes an adjustment screw 74 which communicates with the second lever end 70 such that the first lever end 68 secures the insert 12 in the pocket 14.

In an initial, seated position of the insert 12 in the pocket 14, for example, the first main abutment surface 24 abuts the base abutment surface 55. The first wall abutment surface 60 abuts a first side abutment surface 50 adjacent a cutting portion 36 on the first main surface 18. The second wall abutment surface 62 abuts a second side abutment surface 52 located adjacent the opposite cutting portion 36 on the first main surface 18.

In a final, secured position, when the adjustment screw 74 is fully fastened, the adjustment screw 74 abuts and pushes the second lever end 70 such that the first lever end 68 abuts one of the recess abutment surfaces 32. The secured position also includes the same engagements of the seated position between the insert and the tool pocket, and the lever 66 and the recess abutment surface 32, but with the additional force created by the lever 66 against the recess abutment 32, which is then transferred from the insert to the tool pocket.

Attention is drawn to FIG. 7. The direction of elongation axes E1, E2 determines the direction, or approximate direction, of abutment in which the first lever end 68 applies the abutment force. Specifically, each elongation axis E1, E2 can intersect its associated recess abutment surfaces 32 in a view perpendicular to the median plane P. As seen in FIG. 7, each elongation axis E1, E2 can intersect diagonally opposite corners of the insert. Although in the present embodiment the elongation axes E1, E2 are directed towards, and intersect, the cutting portions 36, and specifically the corner cutting edges 40, it is not obligatory. The clamping recesses 26, 28 can be independent of the cutting portions 36, and the direction of force applied onto the insert 12 (general location and orientation of the recess abutment surface 32) can be engineered/oriented according to the required application. The elongation axes E1, E2 are therefore independent of the cutting portion 36 geometry. This allows for flexibility in locating the clamping bore 64, relative to the tool pocket 14 when designing a tool.

The orientation and location of the clamping recesses 26, 28 in the main surface 18, 20 are chosen to prevent incorrect seating orientation, or insertion, of the insert into the pocket 14. This, even in cases when the operator purposefully attempts to do so. This is achieved in accordance with a matching shape of the second lever end 70. In other words, the shape of the clamping member that pushes against the clamping recess and secures, or holds, the insert in the pocket is designed to correspond/match a shape of the clamping recess 26, 28. The lever 66 has an elongated shape, generally corresponding to that of the clamping recesses 26, 28, and will only enter a given clamping recess 26, 28 in a certain, correct and aligned orientation. Consequently, the insert 12 can only be secured by the clamping mechanism in one of two desired orientations of the insert within the pocket 14 so that one of the cutting portions 36 of the opposite main surface can be operative. Furthermore, any other incorrect orientations can prevent the insert from fully entering the pocket, or it can lead to a clearly visible slanted orientation of the insert 12 with respect to the tool/pocket 14.

Attention is drawn to FIG. 11-15. Second embodiments of the cutting tool 110, the pocket 114 and the insert 112 are shown. The insert 112 is configured to be selectively secured by either a lever 66 or a clamping screw 75. In other words, each of the first and second clamping recesses 126, 128 have appropriate geometries which enable the insert to be secured by both a lever and a clamping screw. The first and second clamping recesses 126, 128 connect to each other and therefore from a through bore 27 which connects the opposite first and second main surfaces 18. 20 of the cutting insert 112. Each clamping recess 126, 128 includes the same 'basic' geometry as the corresponding clamping recess 26, 28 of the abovementioned first embodiment, and in addition, includes a screw abutment surface 76. According to the present example, the screw abutment surface 76 is conical. According to the second embodiment, the screw abutment surface 76 opens out to the corresponding main abutment surface 24 and connects with the recess abutment surface 32.

Attention is drawn to FIG. 14, which shows a circle which represents the radially outer outline 76a of the screw abutment surface 76 associated with the first main surface 18. When projected onto the median plane P, the screw abutment surfaces 76 and the radially outer outlines 76a belonging to the two clamping recesses 126, 128 overlap. Therefore, in FIG. 14, the screw abutment surface 76 of the viewed clamping recess 126 coincides with, and therefore hides from sight, the hidden screw abutment surface 76 of the hidden clamping recess 128.

The pocket 114 has a pocket protrusion 78 which protrudes outwardly from the base surface 54. The pocket protrusion 78 is configured to enable the aforementioned fool-proof advantages. In other words, in a plan view of the base surface 54, the pocket protrusion has an elongated shape which corresponds to the elongated shape of the clamping recesses 26, 126, 28, 128 to prevent incorrect seating of either insert 12, 112 in the pocket 114. The pocket protrusion 78 is internally threaded and configured to receive the clamping screw 75.

According to some embodiments, both embodiments of the insert 12, 112 are suitable for securement in the second embodiment of the tool 110.

In a secured position of the second embodiment, the insert 112 is seated in the pocket 114 and the clamping screw 75 is screw threaded into the pocket protrusion 75 and abuts the screw abutment surface 76.

What is claimed is:
1. A double-sided cutting insert (12, 112) having orientation-assisting geometry and a central axis (C) around which the insert is indexable, the insert comprising:
   opposite and identical first and second main surfaces (18, 20) and an insert peripheral surface (22) extending therebetween, each main surface (18, 20) comprising two cutting portions (36) located on diagonally opposite sides of the central axis (C) and two non-cutting portions (37) located on two other diagonally opposite sides of the central axis (C), each cutting portion including:
first and second main cutting edges (39, 40) formed at an intersection of respective first and second rake surfaces (42, 43) with respective first and second relief surfaces (46, 47); and
a corner cutting edge (40) formed at an intersection of a corner rake surface (44) and a corner relief surface (48); wherein:
the insert peripheral surface (22) includes the first and second relief surfaces (46, 47) and the corner relief surface (48);
a median plane (P) perpendicular to the central axis (C) and located midway between the first and second main surfaces (18, 20), the first and second relief surfaces (46, 47), and the corner relief surface (48), being perpendicular to the median plane (P); and
opposite first and second clamping recesses (26, 126, 28, 128) opening out respectively to the first and second main surfaces (18, 20);
wherein:
each clamping recess (26, 126, 28, 128) has a non-circular shape in a view along the central axis (C) and is elongated in a direction parallel to the median plane (P), along a single elongation axis (E1, E2) which represents the direction of the longest dimension of the corresponding clamping recess (26, 126, 28, 128);
in said view along the central axis (C), the elongation axes (E1, E2) form a non-zero offset angle α therebetween;
the single elongation axis (E1, E2) of each clamping recess extends along a direction between the non-cutting portions (37) of the main surface (18, 20) to which that clamping recess opens;
each clamping recess (26, 126, 28, 128) comprises a recess peripheral surface (30a, 30b) which comprises at least one recess abutment surface (32);
projections onto the median plane (P) of at least portions of the first and second clamping recesses (26, 126, 28, 128) are rotationally offset with respect to one another about the central axis (C);
between each cutting portion (36) and the median plane (P), the insert peripheral surface (22) further includes associated first and second side abutment surfaces (50, 52) which extend respectively from the first and second relief surfaces (46, 47); and
the first and second side abutment surfaces (50, 52) extend inwardly from the first and second relief surfaces (46, 47), respectively, towards the central axis (C).

2. The cutting insert (12, 112) according to claim 1, wherein no cutting portion (36) of the first main surface (16) is located opposite a cutting portion (36) of the second main surface (18).

3. The cutting insert (12, 112) according to claim 1, wherein the first and second clamping recesses (26, 126, 28, 128) connect to one another to thereby form a through hole (27) connecting the first and second main surfaces (18, 20).

4. The cutting insert (12, 112) according to claim 1, wherein:
in a projection onto the median plane (P) of outlines (34a, 34b) of the two recess peripheral surfaces (30a, 30b), the projected outline (34a) of one recess peripheral surface (30a) intersects the projected outline (34b) of the other recess peripheral surface (30b) only at four vertices.

5. The cutting insert (12, 112) according to claim 1, wherein:
in a projection onto the median plane (P) of outlines (34a, 34b) of the two recess peripheral surfaces (30a, 30b), the projected outlines (34a, 34b) are identical and the projected outline (34a) of one recess peripheral surface (30a) is rotationally offset about the central axis (C) with respect to the projected outline (34b) of the other recess peripheral surface (30b).

6. The cutting insert (12, 112) according to claim 1, wherein:
in a projection onto the median plane (P) of outlines (34a, 34b) of the two recess peripheral surfaces (30a, 30b), no portion of the projected outline (34a) of one recess peripheral surface (30a) is tangent to any portion of the projected outline (34b) of the other recess peripheral surface (30b).

7. The cutting insert (12, 112) according to claim 1, wherein:
the offset angle (α) is 90 degrees.

8. The cutting insert (12, 112) according to claim 1, wherein the recess abutment surface (32) extends in a direction perpendicular to the median plane (P).

9. The cutting insert (12, 112) according to claim 1, wherein the clamping recesses (26, 126, 28, 128) are non-threaded.

10. The cutting insert (12, 112) according to claim 1, wherein none of the clamping recesses (26, 126, 28, 128) extends beyond the median plane (P).

11. The cutting insert (12, 112) according to claim 1, wherein the first and second clamping recesses (26, 126, 28, 128) are identical to one another.

12. The cutting insert (112) according to claim 1, wherein each clamping recess (126, 128) further comprises a screw abutment surface (76) which opens out to a corresponding main abutment surface (18, 20).

13. The cutting insert (12, 112) according to claim 1, wherein each clamping recess (26, 126, 28, 128) has an oval shape in said view along the central axis (C).

14. The cutting insert (12, 112) according to claim 1, wherein:
the first and second side abutment surfaces (50, 52) which extend from respective first and second relief surfaces (46, 47) of either of the main surfaces (18, 20), extend past the median plane (P) towards the opposite main surface (18, 20).

15. The cutting insert (12, 112) according to claim 1, wherein:
the first and second side abutment surfaces (50, 52) which extend from respective first and second relief surfaces (46, 47) of either of the main surfaces (18, 20), extend past the median plane (P) towards the opposite main surface (18, 20).

16. A cutting tool (10, 110) comprising a tool body (16) having a pocket (14, 114) and the insert (12, 112) according to claim 1 secured therein, the pocket (14, 114) comprising:
a base abutment surface (55);
first and second wall abutment surfaces (60, 62); and
a clamping member (66, 75) configured to abut one of the first and second clamping recesses (26, 126, 28, 128) of the insert (12, 112) and secure it to thereby secure the insert in the pocket (14, 114).

17. The cutting tool (10, 100) according to claim 16 wherein one of the first and second main surfaces (18, 20) abuts the base abutment surface (55) and the insert peripheral surface (22) abuts the first and second wall abutment surfaces (60, 62).

18. The cutting tool (10) according to claim 16, wherein:
the tool body (16) further comprises an adjustment bore (72) configured to receive an adjustment screw (74);
the clamping member (66) is a clamping lever (66) occupying a clamping bore (66) which is connected to the adjustment bore (72): and
the clamping lever (66) abuts the recess abutment surface (32), to secure the insert (12) in the pocket (14).

19. The cutting tool (110) according to claim 16, wherein:
each clamping recesses (126, 128) further comprises a screw abutment surface (76) which opens out to a corresponding main abutment surface (18, 20); and
the clamping member (75) is a clamping screw (75) which abuts the screw abutment surface (76) to secure the insert (112) in the pocket (114), without contacting the recess abutment surface (32).

20. The cutting tool (10, 100) according to claim 16 wherein:
the pocket walls (56) include respective first and second wall abutment surfaces (60, 62) which are planar and form respective acute wall angles θ with the base abutment surface (55).

21. A double-sided cutting insert (12, 112) having orientation-assisting geometry and a central axis (C) around which the insert is indexable, the insert comprising:
opposite and identical first and second main surfaces (18, 20) and an insert peripheral surface (22) extending therebetween, each main surface (18, 20) comprising two cutting portions (36) located on diagonally opposite sides of the central axis (C) and two non-cutting portions (37) located on two other diagonally opposite sides of the central axis (C), each cutting portion including:
first and second main cutting edges (39, 40) formed at an intersection of respective first and second rake surfaces (42, 43) with respective first and second relief surfaces (46, 47); and
a corner cutting edge (40) formed at an intersection of a corner rake surface (44) and a corner relief surface (48); wherein:
the insert peripheral surface (22) includes the first and second relief surfaces (46, 47) and the corner relief surface (48);
a median plane (P) perpendicular to the central axis (C) and located midway between the first and second main surfaces (18, 20); and
opposite first and second clamping recesses (26, 126, 28, 128) opening out respectively to the first and second main surfaces (18, 20);
wherein:
each clamping recess (26, 126, 28, 128) has a non-circular shape in a view along the central axis (C) and is elongated in a direction parallel to the median plane (P), along a single elongation axis (E1, E2) which represents the direction of the longest dimension of the corresponding clamping recess (26, 126, 28, 128);
in said view along the central axis (C), the elongation axes (E1, E2) form a non-zero offset angle α therebetween;
the single elongation axis (E1, E2) of each clamping recess extends along a direction between the non-cutting portions (37) of the main surface (18, 20) to which that clamping recess opens;
the first and second relief surfaces (46, 47), and the corner relief surface (48), are all perpendicular to the median plane (P);
between each cutting portion (36) and the median plane (P), the insert peripheral surface (22) further includes associated first and second side abutment surfaces (50, 52) which extend respectively from the first and second relief surfaces (46, 47); and
the first and second side abutment surfaces (50, 52) extend inwardly from the first and second relief surfaces (46, 47), respectively, towards the central axis (C).

22. The cutting insert (12, 112) according to claim 21, wherein:
the first and second side abutment surfaces (50, 52) which extend from respective first and second relief surfaces (46, 47) of either of the main surfaces (18, 20), extend past the median plane (P) towards the opposite main surface (18, 20).

\* \* \* \* \*